US011696318B2

(12) United States Patent
Ryu et al.

(10) Patent No.: US 11,696,318 B2
(45) Date of Patent: Jul. 4, 2023

(54) INTERFERENCE ESTIMATION FOR RESOURCE AVAILABILITY DETERMINATION

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Franklin Park, NJ (US); Tao Luo, San Diego, CA (US); Juan Montojo, San Diego, CA (US); Jing Sun, San Diego, CA (US); Xiaoxia Zhang, San Diego, CA (US); Peter Gaal, San Diego, CA (US); Arumugam Chendamarai Kannan, San Diego, CA (US); Xiaojie Wang, Hillsborough, NJ (US); Ozcan Ozturk, San Diego, CA (US); Gene Wesley Marsh, San Diego, CA (US); Jelena Damnjanovic, Del Mar, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/148,285

(22) Filed: Jan. 13, 2021

(65) Prior Publication Data
US 2022/0225335 A1 Jul. 14, 2022

(51) Int. Cl.
*H04W 72/08* (2009.01)
*H04B 17/318* (2015.01)
(Continued)

(52) U.S. Cl.
CPC ........ *H04W 72/541* (2023.01); *H04B 17/318* (2015.01); *H04L 41/147* (2013.01); *H04L 43/16* (2013.01); *H04W 72/56* (2023.01)

(58) Field of Classification Search
CPC .. H04W 72/082; H04W 72/10; H04B 17/318; H04L 41/147; H04L 43/16
See application file for complete search history.

(56) References Cited

U.S. PATENT DOCUMENTS

| 2008/0039046 A1* | 2/2008 | Vilzmann | ......... H04W 74/0825 |
| | | | 455/296 |
| 2015/0223257 A1 | 8/2015 | Wilhelmsson et al. | |

(Continued)

FOREIGN PATENT DOCUMENTS

EP 2858406 A1 4/2015

OTHER PUBLICATIONS

International Search Report and Written Opinion—PCT/US2022/070133—ISA/EPO—dated May 22, 2022.

*Primary Examiner* — Derrick V Rose
(74) *Attorney, Agent, or Firm* — Qualcomm Incorporated

(57) ABSTRACT

Various aspects of the present disclosure generally relate to wireless communication. In some aspects, a first wireless communication device may receive, from a second wireless communication device, an announcement associated with a first future communication and that indicates a set of resources associated with the first future communication. The first wireless communication device may communicate using the set of resources based at least in part on a determination that an estimated interference that will result from a second future communication using the set of resources satisfies an interference condition. Numerous other aspects are described.

30 Claims, 9 Drawing Sheets

(51) Int. Cl.
*H04L 12/26* (2006.01)
*H04L 12/24* (2006.01)
*H04W 72/10* (2009.01)
*H04W 72/541* (2023.01)
*H04L 41/147* (2022.01)
*H04L 43/16* (2022.01)
*H04W 72/56* (2023.01)

(56) References Cited

U.S. PATENT DOCUMENTS

| | | | |
|---|---|---|---|
| 2017/0280461 A1 | 9/2017 | Zhang et al. | |
| 2020/0068531 A1* | 2/2020 | Sundberg | H04W 52/0216 |
| 2021/0329596 A1* | 10/2021 | Freda | H04W 72/082 |
| 2022/0201557 A1* | 6/2022 | Wang | H04W 72/0406 |

* cited by examiner

INTERFERENCE ESTIMATION FOR RESOURCE AVAILABILITY DETERMINATION

FIELD OF THE DISCLOSURE

Aspects of the present disclosure generally relate to wireless communication and to techniques and apparatuses for interference estimation for resource availability determination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes receiving, from a second wireless communication device, an announcement associated with a first future communication and that indicates a set of resources associated with the first future communication; and communicating using the set of resources based at least in part on a determination that an estimated interference that will result from a second future communication using the set of resources satisfies an interference condition.

In some aspects, a first wireless communication device for wireless communication includes a memory; and one or more processors operatively coupled to the memory, the memory and the one or more processors configured to: receive, from a second wireless communication device, an announcement associated with a first future communication and that indicates a set of resources associated with the first future communication; and communicate using the set of resources based at least in part on a determination that an estimated interference that will result from a second future communication using the set of resources satisfies an interference condition.

In some aspects, a non-transitory computer-readable medium storing a set of instructions for wireless communication includes one or more instructions that, when executed by one or more processors of a first wireless communication device, cause the first wireless communication device to: receive, from a second wireless communication device, an announcement associated with a first future communication and that indicates a set of resources associated with the first future communication; and communicate using the set of resources based at least in part on a determination that an estimated interference that will result from a second future communication using the set of resources satisfies an interference condition.

In some aspects, a first apparatus for wireless communication includes means for receiving, from a second apparatus, an announcement associated with a first future communication and that indicates a set of resources associated with the first future communication; and means for communicating using the set of resources based at least in part on a determination that an estimated interference that will result from a second future communication using the set of resources satisfies an interference condition.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
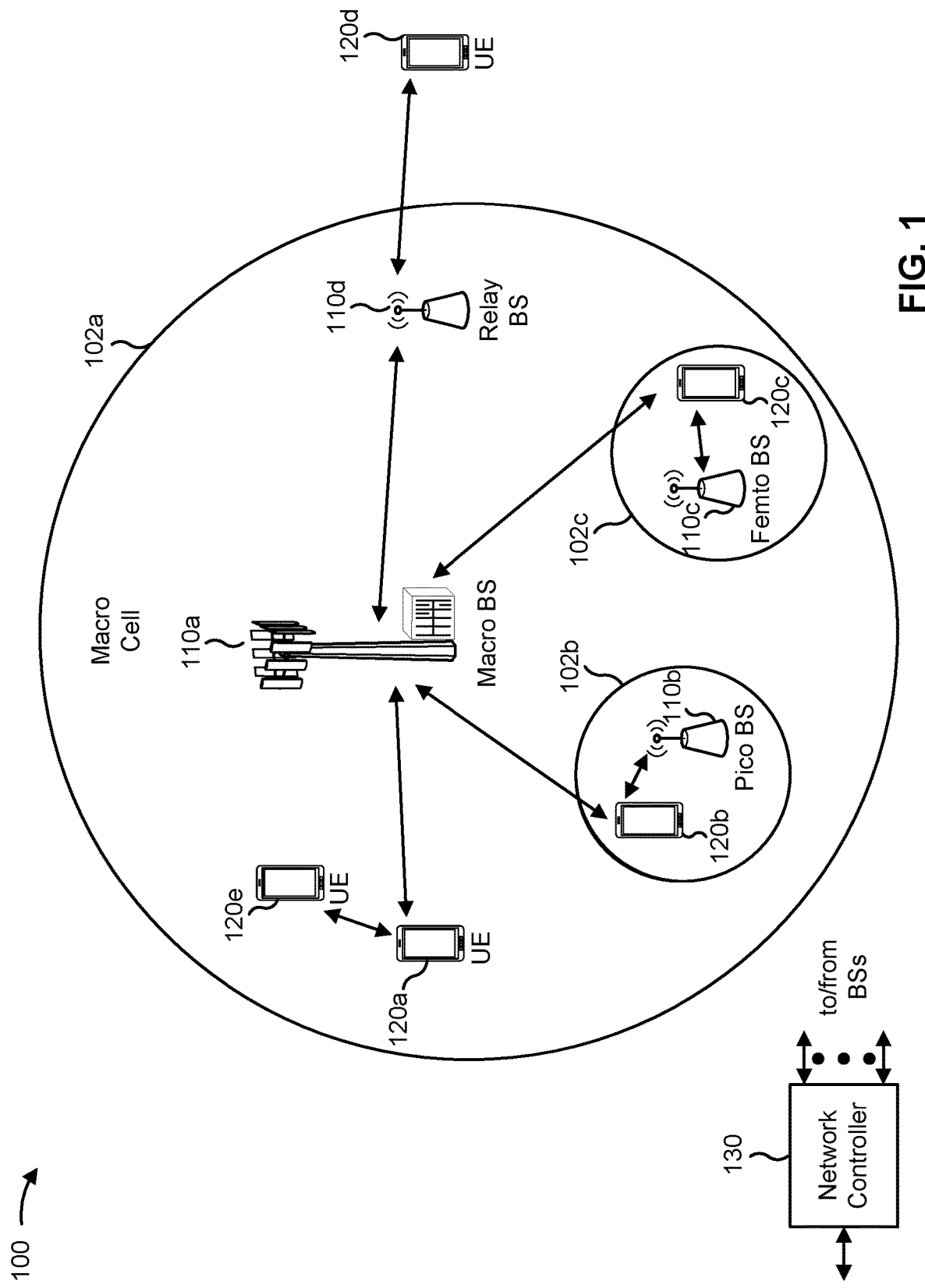
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, an NTN may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A manned aircraft system may include an airplane, helicopter, a dirigible, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations or IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links. Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D)

communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
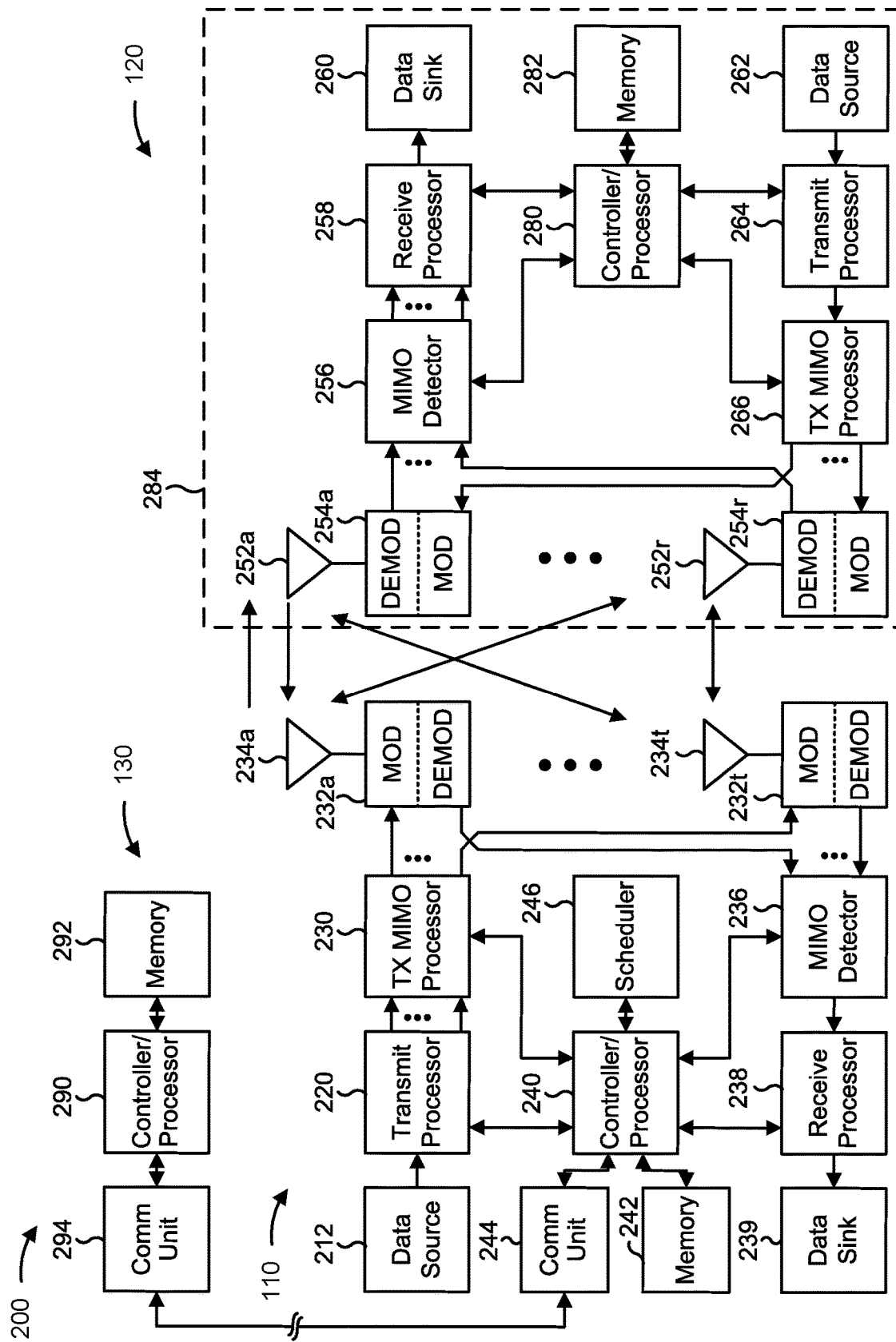
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-8.

Controller/processor 240 of base station 110, controller/processor 280 of UE 120, and/or any other component(s) of FIG. 2 may perform one or more techniques associated with interference estimation for resource availability determination, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein ein. In some aspects, executing instructions may include running the instructions, converting the instructions, compiling the instructions, and/or interpreting the instructions, among other examples.

In some aspects, the first wireless communication device includes means for receiving, from a second wireless communication device, an announcement associated with a first future communication and that indicates a set of resources associated with the first future communication; or means for communicating using the set of resources based at least in part on a determination that an estimated interference that will result from a second future communication using the set of resources satisfies an interference condition. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for determining a RSRP associated with the announcement; or means for determining that the RSRP satisfies an RSRP threshold.

In some aspects, the first wireless communication device includes means for receiving, from the second wireless communication device, an indication of the RSRP threshold.

In some aspects, the first wireless communication device includes means for receiving, from the second wireless communication device, an indication of a set of potential RSRP thresholds, wherein the set of potential RSRP thresholds correspond to a set of potential priorities associated with the second future communication; or means for determining the RSRP threshold by selecting a potential RSRP threshold of the set of potential RSRP thresholds based at least in part on a priority associated with the second future communication.

In some aspects, the first wireless communication device includes means for receiving, from the second wireless communication device, an indication of a set of potential RSRP thresholds, wherein the set of potential RSRP thresholds correspond to a set of potential transmission power levels associated with the second future communication; or means for determining the RSRP threshold by selecting a potential RSRP threshold of the set of potential RSRP thresholds based at least in part on a transmission power level associated with the second future communication.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
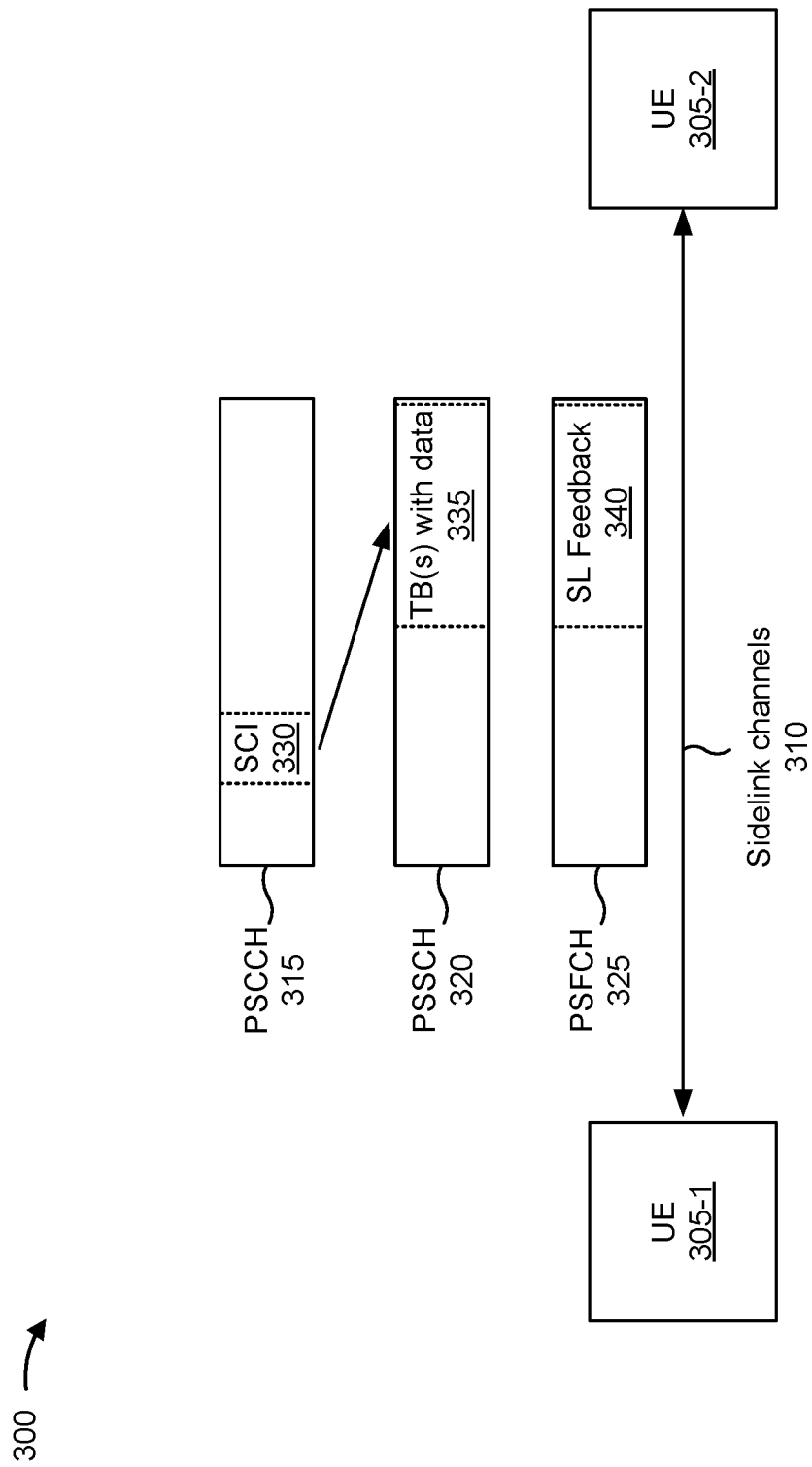
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a RSSI parameter (e.g., a sidelink-RSSI (S-RSSI) parameter) associated with various sidelink channels, may measure a RSRP parameter (e.g., a PSSCH-RSRP parameter) associated with various sidelink channels, may measure a RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
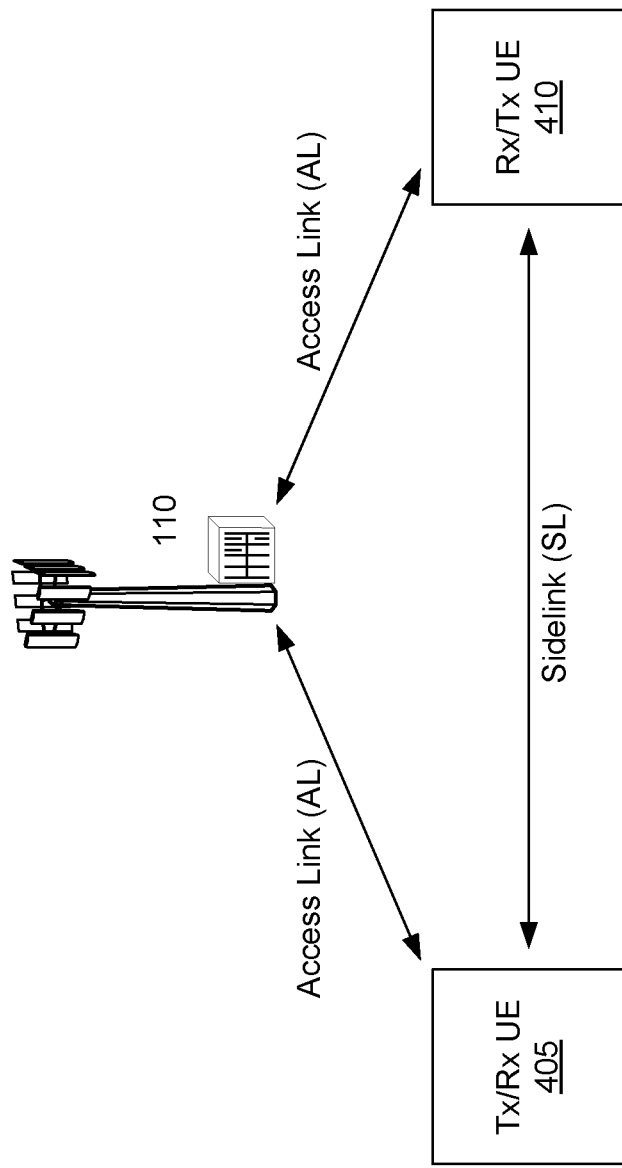
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
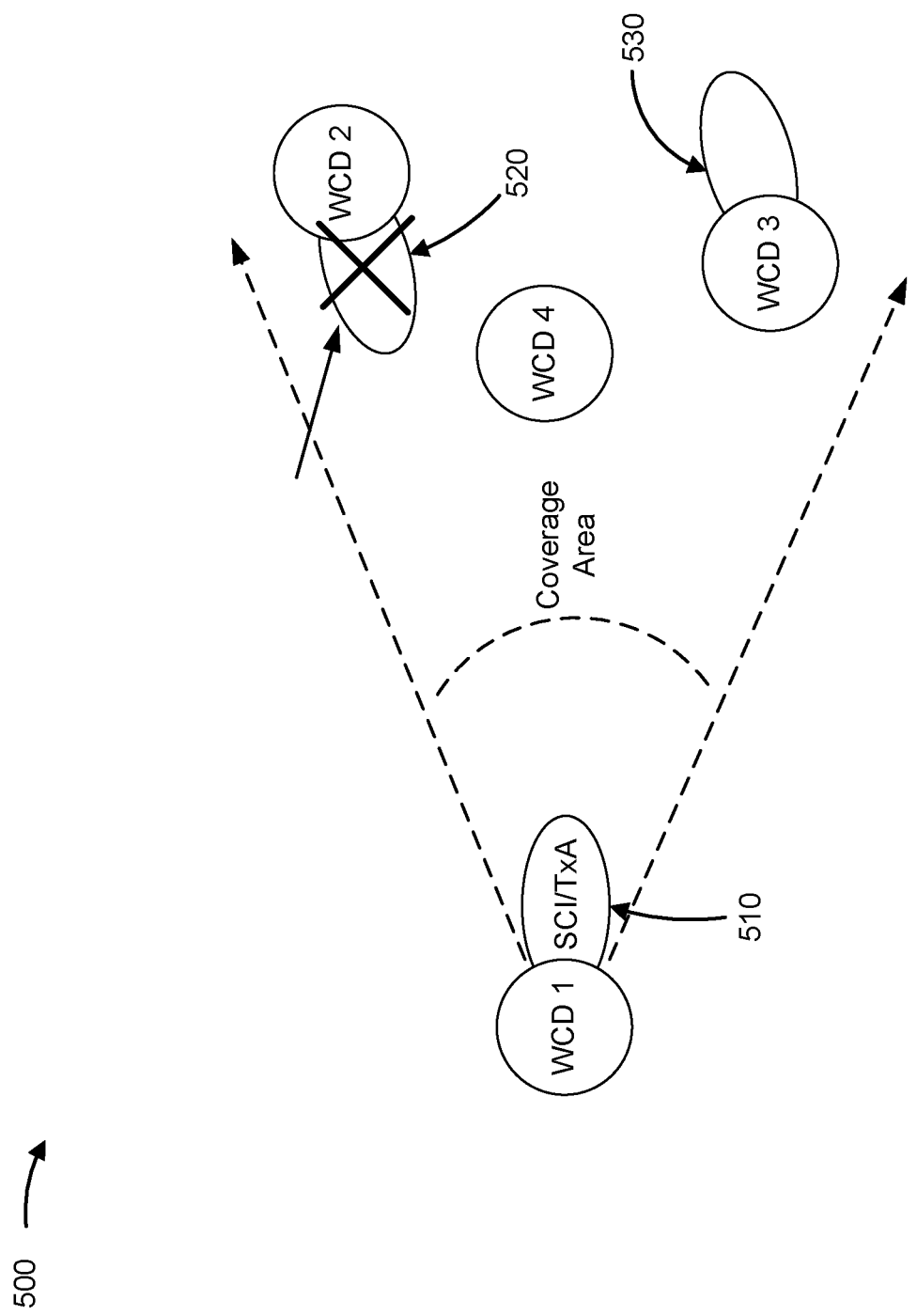
FIGS. 5 and 6 are diagrams illustrating examples of communications in a sidelink network, in accordance with various aspects of the present disclosure.

FIG. 5 is a diagram illustrating an example 500 of communications in a network, in accordance with various aspects of the present disclosure. As shown, a first wireless communication device (WCD 1), a second wireless communication device (WCD 2), a third wireless communication device (WCD 3), and a fourth wireless communication device (WCD 4) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node.

The WCD 1 may be scheduled to transmit a first future communication to WCD 4 using a beam 510. The beam 510 may include an expanding coverage area (e.g., beam width) indicated by the area inside the two dashed arrows in FIG. 5. A future communication is a communication that is to occur at some time in the future. Other WCDs may be scheduled to transmit and/or receive future communications using beams within the coverage area of the beam 510.

For example, as indicated in FIG. 5, the WCD 2 may intend to receive a second future communication. The WCD 2 and/or the device that is transmitting that second future communication to the WCD 2 may be configured to select resources to mitigate and/or minimize interference between the first and second future communications. To facilitate avoidance of interference, WCDs may transmit announcements that indicate future communications. In some aspects, announcements may include transmission (Tx) announcements (shown in FIG. 5 as "TxA") that indicate a future transmission of a communication and/or reception (Rx) announcements (shown in FIG. 6 as "RxA") that indicate a future reception of a communication. TxAs and RxAs may indicate the resources that will be used for the future communication.

For example, a transmission announcement may indicate a set of resources reserved for a future transmission of a communication. In some cases, a transmission announcement may be transmitted using a beam to be used to transmit the transmission that is indicated by the transmission announcement. In some cases, the transmission announcement may be transmitted using a beam that is wider than the beam to be used to transmit the transmission indicated by the transmission announcement. In this case, the transmission announcement may be used to facilitate preventing a WCD within the coverage area from using resources, in a direction overlapped by the coverage area, that overlap resources used by the WCD 1 to transmit the future communication. In some cases, the transmission announcement may be transmitted as part of SCI. A nearby WCD can receive the transmission announcement and, in response to receiving the transmission announcement, can select resources and/or beams that do not overlap those indicated in the announcement.

For example, as shown in FIG. 5, the WCD 2 may intend, at least initially, to transmit and/or receive a communication using the beam 520, which may have a coverage area that overlaps the coverage area of the beam 510. The WCD 2 may receive the transmission announcement and, in response to receiving the transmission announcement, may avoid communicating on the beam 520 (as indicated by the "X" over the beam 520). In some cases, the WCD 2 may avoid communicating using resources indicated in the transmission announcement.

In some cases, the WCD 2 may provide a resource recommendation to another WCD (e.g., WCD 3) that is based at least in part on the transmission announcement. For example, as shown in FIG. 5, the WCD 3 may be receiving using a beam 530 that is directed away from the beam 510 on which the transmission announcement is transmitted. As such, the WCD 3 may not receive the transmission announcement. However, the WCD 2 may transmit a resource recommendation to the WCD 3 that indicates the resource information provided in the transmission announcement and/or that suggests resources for the WCD 3 to use that avoid interference with the future communication.

In some cases, to facilitate reception of relevant transmission announcements, a WCD (e.g., WCD 2) may monitor for transmission announcements using a beam that the WCD intends to use to transmit or receive a communication. In some cases, to further facilitate avoidance of interference, a WCD that intends to receive a communication may monitor for transmission announcements. Similarly, a WCD that intends to transmit a communication may monitor for reception announcements.

As indicated above, FIG. 5 is provided as an example. Other examples may differ from what is described with respect to FIG. 5.

Figure 6:
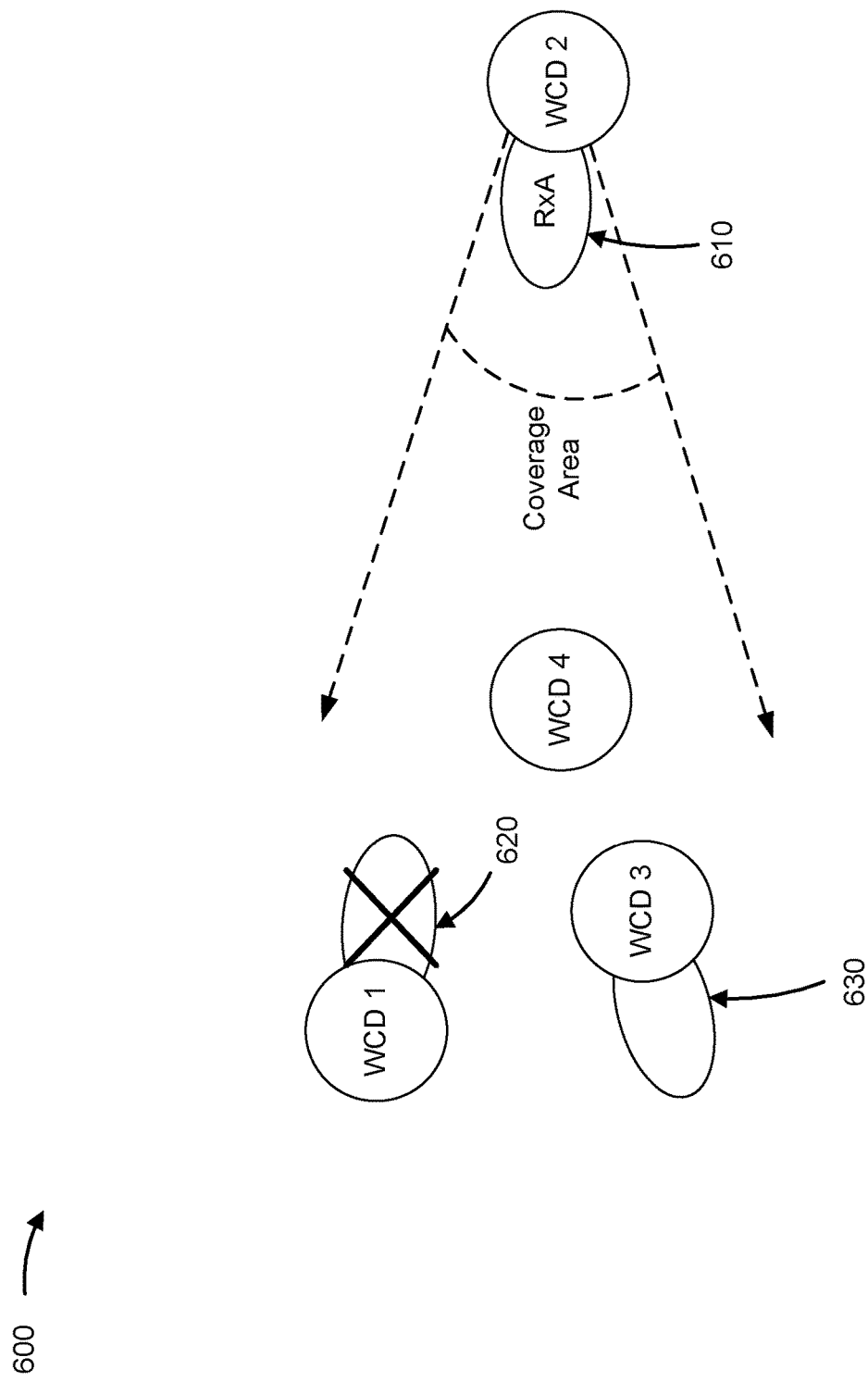

FIG. 6 is a diagram illustrating an example 600 of communications in a network, in accordance with various aspects of the present disclosure. As shown, a first wireless communication device (WCD 1), a second wireless communication device (WCD 2), a third wireless communication device (WCD 3), and a fourth wireless communication device (WCD 4) may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs may be, include, or be included in a UE, a base station, and/or an IAB node. In some cases, the WCDs may be the WCDs depicted in FIG. 5.

The WCD 2 may be scheduled to receive a first future communication from WCD 4 using a beam 610. The beam 610 may include an expanding coverage area (e.g., beam width) indicated by the area inside the two dashed arrows in FIG. 6. Other WCDs may be scheduled to transmit and/or receive future communications using beams within the coverage area of the beam 610.

For example, as indicated in FIG. 6, the WCD 1 may intend to transmit a second future communication. The WCD 1 and/or the device that is receiving that second future communication from the WCD 1 may be configured to select resources to mitigate and/or minimize interference between the first and second future communications. To facilitate avoidance of interference, WCDs may transmit announcements that indicate future communications. In some aspects, for example, a reception announcement (shown as "RxA") may indicate a set of resources reserved for a future reception of a communication. In some cases, a reception announcement may be received using a beam to be used to receive the communication that is indicated by the reception announcement. In some cases, the reception announcement may be transmitted using a beam that is wider than the beam to be used to receive the communication indicated by the reception announcement. In this case, the reception announcement may be used to facilitate preventing a WCD within the coverage area from using resources, in a direction overlapped by the coverage area, that overlap resources used by the WCD 2 to receive the future communication. In some cases, the reception announcement may be transmitted as part of a PSFCH or similar channel. A nearby WCD can receive the reception announcement and, in response to receiving the reception announcement, can select resources and/or beams that do not overlap those indicated in the announcement.

For example, as shown in FIG. 6, the WCD 1 may intend, at least initially, to transmit and/or receive a communication using the beam 620, which may have a coverage area that overlaps the coverage area of the beam 610. The WCD 1 may receive the reception announcement and, in response to receiving the reception announcement, may avoid communicating on the beam 620 (as indicated by the "X" over the beam 620). In some cases, the WCD 1 may avoid communicating using resources indicated in the reception announcement.

In some cases, the WCD 1 may provide a resource recommendation to another WCD (e.g., WCD 3) that is based at least in part on the reception announcement. For example, as shown in FIG. 6, the WCD 3 may be receiving using a beam 630 that is directed away from the beam 610 on which the reception announcement is transmitted. As such, the WCD 3 may not receive the reception announcement. However, the WCD 1 may transmit a resource recommendation to the WCD 3 that indicates the resource information provided in the reception announcement and/or that suggests resources for the WCD 3 to use that avoid interference with the future communication. In some cases, to facilitate reception of relevant reception announcements, a WCD (e.g., WCD 1) may monitor for reception announcements using a beam that the WCD intends to use to transmit or receive a communication.

In some cases, a transmission announcement and/or reception announcement may indicate a future resource reservation. The WCD 1 may select, based on the announcement, a set of resources for a future communication that are different than the set of resources indicated by the future resource reservation. In this way, the WCD 1 may be able to minimize interference between the future communication indicated in the announcement and a future communication the WCD 1 is scheduled to perform. However, it may be the case that the WCD 1 could use the one or more resources indicated in the announcement effectively because the use of those resources will be likely to cause interference that does not exceed an interference tolerance (e.g., interference condition). In that case, avoiding using the one or more resources may result in inefficient resource consumption and/or reduced network performance.

Aspects of the techniques and apparatuses described herein may provide for interference measurement for resource availability determination. For example, in some aspects, a wireless communication device may receive an announcement from another wireless communication device associated with a first future communication. The wireless communication device may determine an estimated interference on the first future communication by a second future communication between the wireless communication devices. The wireless communication device may determine that the estimated interference satisfies an interference condition. For example, in some aspects, an estimated interference that satisfies the interference condition is an amount of interference that has been determined to be acceptable for a communication, communication type, and/or channel. Based at least in part on determining that the estimated interference satisfies an interference condition, the wireless communication device may use one or more resources for the second future communication that are also to be used for the first future communication. In this way, some aspects described herein may facilitate more efficient use of network resources.

As indicated above, FIG. 6 is provided as an example. Other examples may differ from what is described with respect to FIG. 6.

Figure 7:
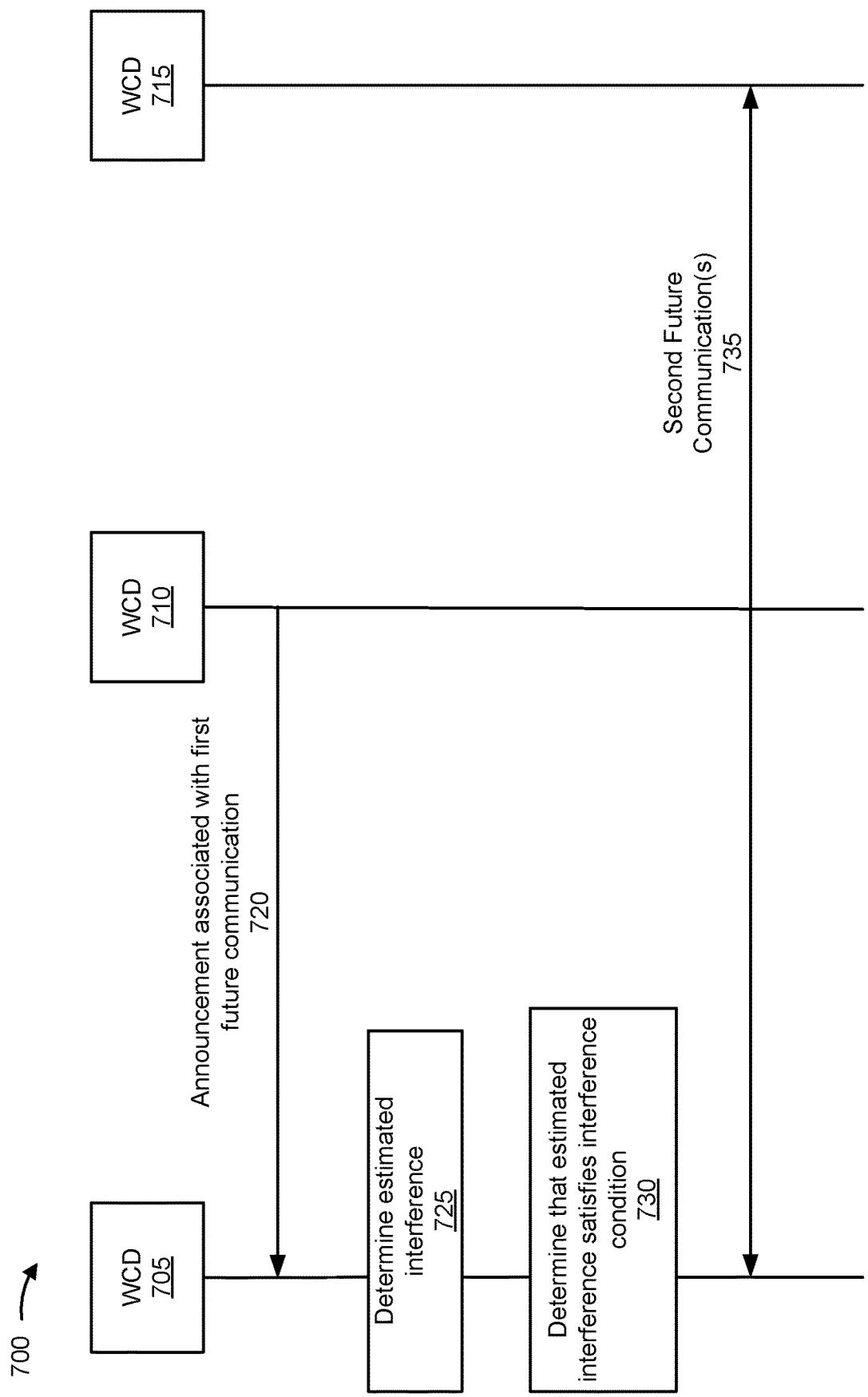
FIG. 7 is a diagram illustrating an example associated with interference estimation for resource availability determination, in accordance with various aspects of the present disclosure.

FIG. 7 is a diagram illustrating an example 700 associated with interference estimation for resource availability determination, in accordance with various aspects of the present disclosure. As shown, a first WCD 705, a second WCD 710, and a third WCD 715 may communicate in a network. The network may be any type of network in which devices may communicate with other devices using beamforming techniques. For example, the network may be a millimeter wave network. In some cases, the network may be a sidelink network and/or an IAB network, among other examples. In some aspects, one or more of the WCDs 705, 710, and 715 may be, include, or be included in a UE, a base station, and/or an IAB node.

As shown by reference number 720, the second WCD 710 may transmit, and the first WCD 705 may receive, an announcement associated with a first future communication. The announcement may include a transmission announcement or a reception announcement. In some aspects, the announcement may indicate a set of resources associated with the first future communication. In some aspects, the first WCD 705 may monitor for announcements using a beam and, for example, the announcement may be received using that beam. In some aspects, the WCD 705 may monitor for announcements using a beam or beam that are to be used for the first future communication.

As shown by reference number 725, The WCD 705 may determine an estimated interference associated with the first future communication and a second future communication that the WCD 705 is scheduled to perform. In some aspects, the WCD 705 may determine the estimated interference based at least in part on one or more transmission parameters associated with the second future communication, one or more transmission parameters indicated in the announcement, one or more channel characteristics associated with a channel on which the announcement is received, and/or one or more channel characteristics associated with a channel on which the first future communication and/or the second future communication are scheduled to be transmitted and/or received.

For example, in some aspects, the WCD 705 may determine the estimated interference by determining an RSRP associated with the announcement. For example, the WCD 705 may determine the RSRP of the radio signal carrying the announcement. In some aspects, the RSRP may be considered to be the estimated interference, as it may be used as a proxy for interference.

As shown by reference number 730, the WCD 705 may determine that the estimated interference satisfies an interference condition. The interference condition may be a condition that, if satisfied, may be used to determine that the first future communication and the second future communication will not interfere with one another to a degree that would make one of the communications unreliable, inefficient or otherwise undesirable. For example, in some aspects, an estimated interference that satisfies the interference condition is an amount of interference that has been determined to be acceptable.

In some aspects, the interference condition may include an RSRP threshold, and the WCD 705 may determine that the estimated interference condition is satisfied by determining that the RSRP satisfies an RSRP threshold. In some aspects, the RSRP threshold may be specified in a wireless communication standard. In some aspects, the RSRP threshold may be based at least upon a priority associated with the first future communication. The announcement may indicate the priority associated with the first future communication. In some aspects, the priority associated with the first future communication may be specified in a wireless communication standard. In some aspects, the RSRP threshold may be based at least upon a priority associated with the second future communication.

The RSRP threshold may be based at least upon a rank associated with the first future communication. The announcement may indicate the rank associated with the first future communication. In some aspects, the rank associated with the first future communication may be specified in a wireless communication standard. In some aspects, the RSRP threshold may be based at least upon a rank associated with the second future communication.

In some aspects, the WCD 710 may transmit, and the WCD 705 may receive, an indication of the RSRP threshold. The indication of the RSRP threshold may be carried in the announcement. In some aspects, the RSRP threshold may include a maximum RSRP. In some aspects, the RSRP threshold may include a minimum RSRP. In some aspects, the WCD 710 may transmit, and the WCD 705 may receive an indication of a set of potential RSRP thresholds. The set of potential RSRP thresholds may correspond to a set of potential priorities and/or transmission power levels associated with the second future communication. The WCD 705 may determine the RSRP threshold by selecting a potential RSRP threshold of the set of potential RSRP thresholds. The WCD 705 may select the RSRP threshold from the set of potential RSRP thresholds based at least in part on a priority associated with the second future communication. In some aspects, the set of potential RSRP thresholds may be specified in a wireless communication standard.

As shown by reference number 735, the WCD 705 and the WCD 715 may communicate with one another using the set of resources based at least in part on the determination that the estimated interference that will result from a second future communication (e.g., the communication indicated by reference number 735) using the set of resources satisfies an interference condition.

As indicated above, FIG. 7 is provided as an example. Other examples may differ from what is described with respect to FIG. 7.

Figure 8:
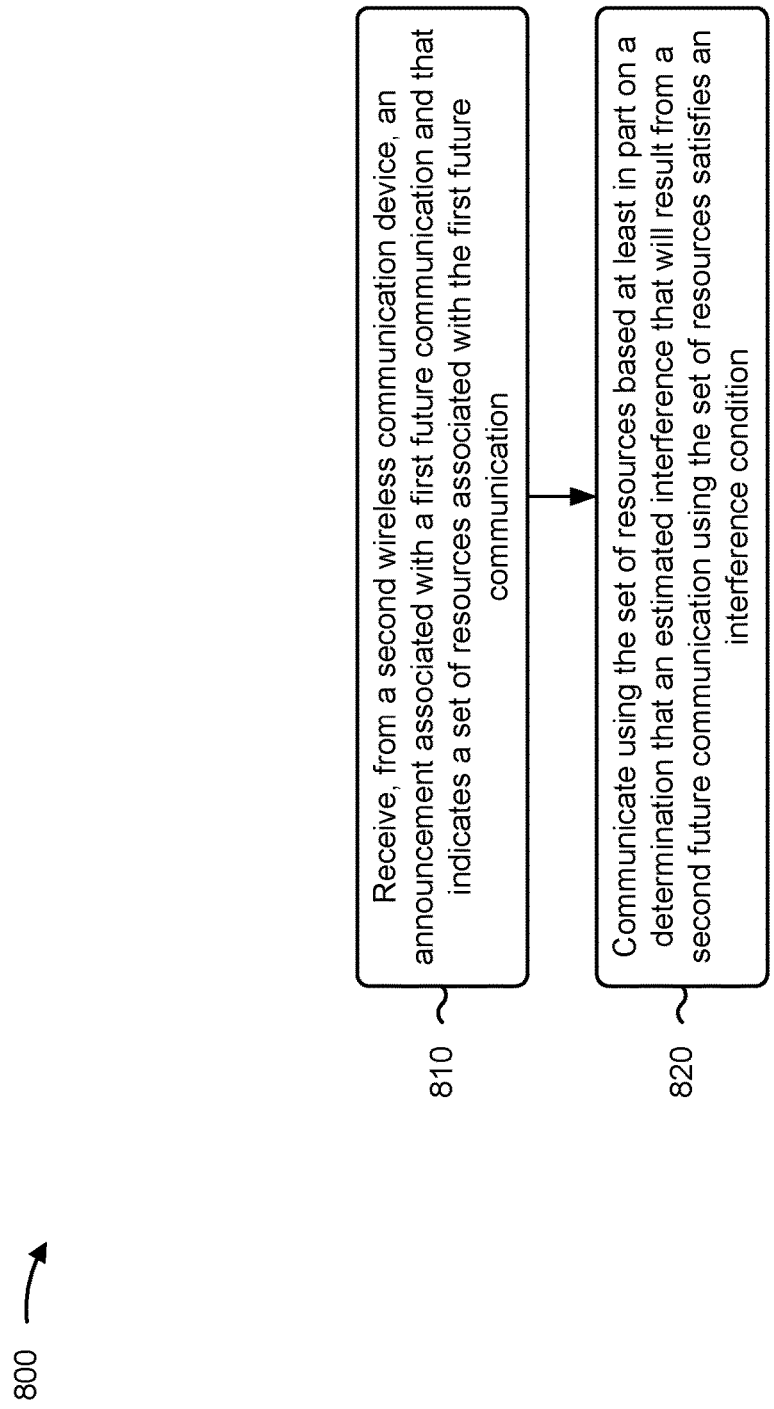
FIG. 8 is a diagram illustrating an example process associated with interference estimation for resource availability determination, in accordance with various aspects of the present disclosure.

FIG. 8 is a diagram illustrating an example process 800 performed, for example, by a first wireless communication device, in accordance with various aspects of the present disclosure. Example process 800 is an example where the first wireless communication device (e.g., first wireless communication device 705, apparatus 900) performs operations associated with interference estimation for resource availability determination.

As shown in FIG. 8, in some aspects, process 800 may include receiving, from a second wireless communication device, an announcement associated with a first future communication and that indicates a set of resources associated with the first future communication (block 810). For example, the first wireless communication device (e.g., using reception component 902, depicted in FIG. 2) may receive, from a second wireless communication device, an announcement associated with a first future communication and that indicates a set of resources associated with the first future communication, as described above.

As further shown in FIG. 8, in some aspects, process 800 may include communicating using the set of resources based at least in part on a determination that an estimated interference that will result from a second future communication using the set of resources satisfies an interference condition (block 820). For example, the first wireless communication device (e.g., using reception component 902 and/or transmission component 904, depicted in FIG. 9) may communicate using the set of resources based at least in part on a determination that an estimated interference that will result from a second future communication using the set of resources satisfies an interference condition, as described above.

Process 800 may include additional aspects, such as any single aspect or any combination of aspects described below and/or in connection with one or more other processes described elsewhere herein.

In a first aspect, receiving the announcement comprises receiving the announcement using a beam, and wherein communicating comprises communicating using the beam.

In a second aspect, alone or in combination with the first aspect, process 800 includes determining an RSRP associated with the announcement, and determining that the RSRP satisfies an RSRP threshold, wherein the determination that the estimated interference satisfies the interference condition is based at least in part on determining that the RSRP satisfies the RSRP threshold.

In a third aspect, alone or in combination with one or more of the first and second aspects, the RSRP threshold is specified in a wireless communication standard.

In a fourth aspect, alone or in combination with one or more of the first through third aspects, the RSRP threshold is based at least upon a priority associated with the first future communication.

In a fifth aspect, alone or in combination with one or more of the first through fourth aspects, the announcement indicates the priority associated with the first future communication.

In a sixth aspect, alone or in combination with one or more of the first through fifth aspects, the priority associated with the first future communication is specified in a wireless communication standard.

In a seventh aspect, alone or in combination with one or more of the first through sixth aspects, the RSRP threshold is based at least upon a priority associated with the second future communication.

In an eighth aspect, alone or in combination with one or more of the first through seventh aspects, the RSRP threshold is based at least upon a rank associated with the first future communication.

In a ninth aspect, alone or in combination with one or more of the first through eighth aspects, the announcement indicates the rank associated with the first future communication.

In a tenth aspect, alone or in combination with one or more of the first through ninth aspects, the rank associated with the first future communication is specified in a wireless communication standard.

In an eleventh aspect, alone or in combination with one or more of the first through tenth aspects, the RSRP threshold is based at least upon a rank associated with the second future communication.

In a twelfth aspect, alone or in combination with one or more of the first through eleventh aspects, process 800 includes receiving, from the second wireless communication device, an indication of the RSRP threshold.

In a thirteenth aspect, alone or in combination with one or more of the first through twelfth aspects, the indication of the RSRP threshold is carried in the announcement.

In a fourteenth aspect, alone or in combination with one or more of the first through thirteenth aspects, the RSRP threshold comprises a maximum RSRP.

In a fifteenth aspect, alone or in combination with one or more of the first through fourteenth aspects, the RSRP threshold comprises a minimum RSRP.

In a sixteenth aspect, alone or in combination with one or more of the first through fifteenth aspects, process 800 includes receiving, from the second wireless communication device, an indication of a set of potential RSRP thresholds, wherein the set of potential RSRP thresholds correspond to a set of potential priorities associated with the second future communication, and determining the RSRP threshold by selecting a potential RSRP threshold of the set of potential RSRP thresholds based at least in part on a priority associated with the second future communication.

In a seventeenth aspect, alone or in combination with one or more of the first through sixteenth aspects, the set of potential RSRP thresholds is specified in a wireless communication standard.

In an eighteenth aspect, alone or in combination with one or more of the first through seventeenth aspects, process 800 includes receiving, from the second wireless communication device, an indication of a set of potential RSRP thresholds, wherein the set of potential RSRP thresholds correspond to a set of potential transmission power levels associated with the second future communication, and determining the RSRP threshold by selecting a potential RSRP threshold of the set of potential RSRP thresholds based at least in part on a transmission power level associated with the second future communication.

In a nineteenth aspect, alone or in combination with one or more of the first through eighteenth aspects, the set of potential RSRP thresholds is specified in a wireless communication standard.

In a twentieth aspect, alone or in combination with one or more of the first through nineteenth aspects, the announcement comprises a reception announcement.

In a twenty-first aspect, alone or in combination with one or more of the first through twentieth aspects, the announcement comprises a transmission announcement.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
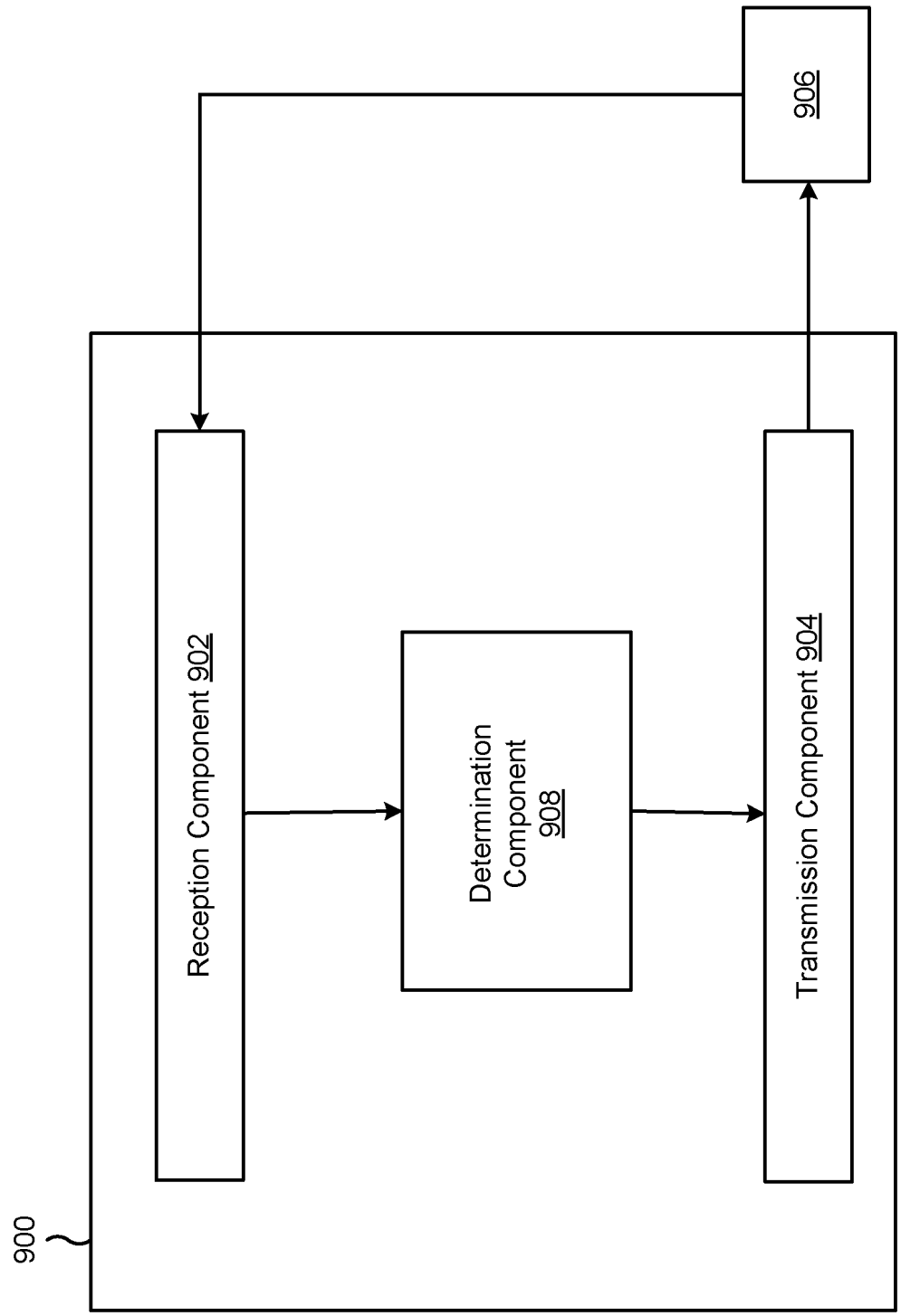
FIG. 9 is a block diagram of an example apparatus for wireless communication, in accordance with various aspects of the present disclosure.

FIG. 9 is a block diagram of an example apparatus 900 for wireless communication. The apparatus 900 may be a wireless communication device, or a wireless communication device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 7. Additionally, or alternatively, the apparatus 900 may be configured to perform a process described herein, such as process 800 of FIG. 8. In some aspects, the apparatus 900 and/or one or more components shown in FIG. 9 may include one or more components of the wireless communication device described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless communication device described above in connection with FIG. 2. In some aspects, the transmission component 904 may be co-located with the reception component 902 in a transceiver.

The reception component 902 may receive, from a second wireless communication device, an announcement associated with a first future communication and that indicates a set of resources associated with the first future communication. The reception component/transmission component may communicate using the set of resources based at least in part on a determination that an estimated interference that will result from a second future communication using the set of resources satisfies an interference condition.

The determination component 908 may determine an RSRP associated with the announcement. The determination component 908 may determine that the RSRP satisfies an RSRP threshold. The reception component 902 may receive, from the second wireless communication device, an indication of the RSRP threshold.

In some aspects, the reception component 902 may receive, from the second wireless communication device, an indication of a set of potential RSRP thresholds, wherein the set of potential RSRP thresholds correspond to a set of potential priorities associated with the second future communication.

The determination component 908 may determine the RSRP threshold by selecting a potential RSRP threshold of the set of potential RSRP thresholds based at least in part on a priority associated with the second future communication. The reception component 902 may receive, from the second wireless communication device, an indication of a set of potential RSRP thresholds, wherein the set of potential RSRP thresholds correspond to a set of potential transmission power levels associated with the second future communication. The determination component 908 may determine the RSRP threshold by selecting a potential RSRP threshold of the set of potential RSRP thresholds based at least in part on a transmission power level associated with the second future communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a first wireless communication device, comprising: receiving, from a second wireless communication device, an announcement associated with a first future communication and that indicates a set of resources associated with the first future communication; and communicating using the set of resources based at least in part on a determination that an estimated interference that will result from a second future communication using the set of resources satisfies an interference condition.

Aspect 2: The method of aspect 1, wherein receiving the announcement comprises receiving the announcement using a beam, and wherein communicating comprises communicating using the beam.

Aspect 3: The method of either of aspects 1 or 2, further comprising: determining a reference signal received power (RSRP) associated with the announcement; and determining that the RSRP satisfies an RSRP threshold, wherein the determination that the estimated interference satisfies the interference condition is based at least in part on determining that the RSRP satisfies the RSRP threshold.

Aspect 4: The method of aspect 3, wherein the RSRP threshold is specified in a wireless communication standard.

Aspect 5: The method of either of aspects 3 or 4, wherein the RSRP threshold is based at least upon a priority associated with the first future communication.

Aspect 6: The method of aspect 5, wherein the announcement indicates the priority associated with the first future communication.

Aspect 7: The method of either of aspects 5 or 6, wherein the priority associated with the first future communication is specified in a wireless communication standard.

Aspect 8: The method of any of aspects 3-7, wherein the RSRP threshold is based at least upon a priority associated with the second future communication.

Aspect 9: The method of any of aspects 3-8, wherein the RSRP threshold is based at least upon a rank associated with the first future communication.

Aspect 10: The method of aspect 9, wherein the announcement indicates the rank associated with the first future communication.

Aspect 11: The method of either of aspects 9 or 10, wherein the rank associated with the first future communication is specified in a wireless communication standard.

Aspect 12: The method of any of aspects 3-11, wherein the RSRP threshold is based at least upon a rank associated with the second future communication.

Aspect 13: The method of any of aspects 3-12, further comprising receiving, from the second wireless communication device, an indication of the RSRP threshold.

Aspect 14: The method of aspect 13, wherein the indication of the RSRP threshold is carried in the announcement.

Aspect 15: The method of either of aspects 13 or 14, wherein the RSRP threshold comprises a maximum RSRP.

Aspect 16: The method of either of aspects 13 or 14, wherein the RSRP threshold comprises a minimum RSRP.

Aspect 17: The method of any of aspects 3-16, further comprising: receiving, from the second wireless communication device, an indication of a set of potential RSRP thresholds, wherein the set of potential RSRP thresholds correspond to a set of potential priorities associated with the second future communication; and determining the RSRP threshold by selecting a potential RSRP threshold of the set of potential RSRP thresholds based at least in part on a priority associated with the second future communication.

Aspect 18: The method of aspect 17, wherein the set of potential RSRP thresholds is specified in a wireless communication standard.

Aspect 19: The method of any of aspects 3-18, further comprising: receiving, from the second wireless communication device, an indication of a set of potential RSRP thresholds, wherein the set of potential RSRP thresholds correspond to a set of potential transmission power levels associated with the second future communication; and determining the RSRP threshold by selecting a potential RSRP threshold of the set of potential RSRP thresholds based at least in part on a transmission power level associated with the second future communication.

Aspect 20: The method of aspect 19, wherein the set of potential RSRP thresholds is specified in a wireless communication standard.

Aspect 21: The method of any of aspects 1-20, wherein the announcement comprises a reception announcement.

Aspect 22: The method of any of aspects 1-20, wherein the announcement comprises a transmission announcement.

Aspect 23: An apparatus for wireless communication at a device, comprising a processor; memory coupled with the processor; and instructions stored in the memory and executable by the processor to cause the apparatus to perform the method of one or more aspects of aspects 1-22.

Aspect 24: A device for wireless communication, comprising a memory and one or more processors coupled to the memory, the memory and the one or more processors configured to perform the method of one or more aspects of aspects 1-22.

Aspect 25: An apparatus for wireless communication, comprising at least one means for performing the method of one or more aspects of aspects 1-22.

Aspect 26: A non-transitory computer-readable medium storing code for wireless communication, the code comprising instructions executable by a processor to perform the method of one or more aspects of aspects 1-22.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
 a memory; and
 one or more processors coupled to the memory, the one or more processors configured to:
  receive, from a second wireless communication device, an announcement associated with a first future communication and that indicates a set of resources associated with the first future communication; and
  communicate using the set of resources based at least in part on a determination that an estimated interference that will result from a second future communication using the set of resources that are to be used for the first future communication satisfies an interference condition.

2. The first wireless communication device of claim 1, wherein the one or more processors, when receiving the announcement, are configured to receive the announcement using a beam, and
 wherein the one or more processors, when communicating, are configured to communicate using the beam.

3. The first wireless communication device of claim 1, wherein the one or more processors are further configured to:
 determine a reference signal received power (RSRP) associated with the announcement; and
 determine that the RSRP satisfies an RSRP threshold,
  wherein the determination that the estimated interference satisfies the interference condition is based at least in part on determining that the RSRP satisfies the RSRP threshold.

4. The first wireless communication device of claim 3, wherein the RSRP threshold is specified in a wireless communication standard.

5. The first wireless communication device of claim 3, wherein the RSRP threshold is based at least upon a priority associated with the first future communication.

6. The first wireless communication device of claim 5, wherein the announcement indicates the priority associated with the first future communication.

7. The first wireless communication device of claim 5, wherein the priority associated with the first future communication is specified in a wireless communication standard.

8. The first wireless communication device of claim 3, wherein the RSRP threshold is based at least upon a priority associated with the second future communication.

9. The first wireless communication device of claim 3, wherein the RSRP threshold is based at least upon a rank associated with the first future communication.

10. The first wireless communication device of claim 9, wherein the announcement indicates the rank associated with the first future communication.

11. The first wireless communication device of claim 9, wherein the rank associated with the first future communication is specified in a wireless communication standard.

12. The first wireless communication device of claim 3, wherein the RSRP threshold is based at least upon a rank associated with the second future communication.

13. The first wireless communication device of claim 3, wherein the one or more processors are further configured to receive, from the second wireless communication device, an indication of the RSRP threshold.

14. The first wireless communication device of claim 13, wherein the indication of the RSRP threshold is carried in the announcement.

15. The first wireless communication device of claim 3, wherein the RSRP threshold comprises a maximum RSRP.

16. The first wireless communication device of claim 3, wherein the RSRP threshold comprises a minimum RSRP.

17. The first wireless communication device of claim 3, wherein the one or more processors are further configured to:
 receive, from the second wireless communication device, an indication of a set of potential RSRP thresholds, wherein the set of potential RSRP thresholds correspond to a set of potential priorities associated with the second future communication; and
 determine the RSRP threshold by selecting a potential RSRP threshold of the set of potential RSRP thresholds based at least in part on a priority associated with the second future communication.

18. The first wireless communication device of claim 17, wherein the set of potential RSRP thresholds is specified in a wireless communication standard.

19. The first wireless communication device of claim 3, wherein the one or more processors are further configured to:
 receive, from the second wireless communication device, an indication of a set of potential RSRP thresholds, wherein the set of potential RSRP thresholds correspond to a set of potential transmission power levels associated with the second future communication; and
 determine the RSRP threshold by selecting a potential RSRP threshold of the set of potential RSRP thresholds based at least in part on a transmission power level associated with the second future communication.

20. The first wireless communication device of claim 19, wherein the set of potential RSRP thresholds is specified in a wireless communication standard.

21. The first wireless communication device of claim 1, wherein the announcement comprises a reception announcement.

22. The first wireless communication device of claim 1, wherein the announcement comprises a transmission announcement.

23. A method of wireless communication performed by a first wireless communication device, comprising:
 receiving, from a second wireless communication device, an announcement associated with a first future communication and that indicates a set of resources associated with the first future communication; and
 communicating using the set of resources based at least in part on a determination that an estimated interference that will result from a second future communication using the set of resources that are to be used for the first future communication satisfies an interference condition.

24. The method of claim 23, further comprising:
 determining a reference signal received power (RSRP) associated with the announcement; and
 determining that the RSRP satisfies an RSRP threshold, wherein the determination that the estimated interference satisfies the interference condition is based at least in part on determining that the RSRP satisfies the RSRP threshold.

25. The method of claim 24, wherein the RSRP threshold is based at least upon a priority associated with the second future communication.

26. The method of claim 24, wherein the RSRP threshold is based at least upon a rank associated with the first future communication.

27. The method of claim 24, further comprising:
 receiving, from the second wireless communication device, an indication of a set of potential RSRP thresholds, wherein the set of potential RSRP thresholds correspond to a set of potential priorities associated with the second future communication; and
 determining the RSRP threshold by selecting a potential RSRP threshold of the set of potential RSRP thresholds based at least in part on a priority associated with the second future communication.

28. The method of claim 24, further comprising:
 receiving, from the second wireless communication device, an indication of a set of potential RSRP thresholds, wherein the set of potential RSRP thresholds correspond to a set of potential transmission power levels associated with the second future communication; and
 determining the RSRP threshold by selecting a potential RSRP threshold of the set of potential RSRP thresholds based at least in part on a transmission power level associated with the second future communication.

29. An apparatus for wireless communication, comprising:
 means for receiving, from a second wireless communication device, an announcement associated with a first future communication and that indicates a set of resources associated with the first future communication; and
 means for communicating using the set of resources based at least in part on a determination that an estimated interference that will result from a second future communication using the set of resources that are to be used for the first future communication satisfies an interference condition.

30. A non-transitory computer-readable medium storing a set of instructions for wireless communication, the set of instructions comprising:
 one or more instructions that, when executed by one or more processors of a first wireless communication device, cause the first wireless communication device to:
 receive, from a second wireless communication device, an announcement associated with a first future communication and that indicates a set of resources associated with the first future communication; and
 communicate using the set of resources based at least in part on a determination that an estimated interference that will result from a second future communication using the set of resources that are to be used for the first future communication satisfies an interference condition.

* * * * *